Feb. 16, 1971   R. N. KNISELEY ET AL   3,563,657
DIRECT-READING SPECTROMETER SYSTEM AND METHOD
FOR NARROW RANGE MEASUREMENTS
Filed Aug. 9, 1968   2 Sheets-Sheet 1

INVENTORS:
RICHARD N. KNISELEY
VELMER A. FASSEL
DANOLD W. GOLIGHTLY

BY: Dawson, Tilton, Falloy & Lungmus
ATT'YS

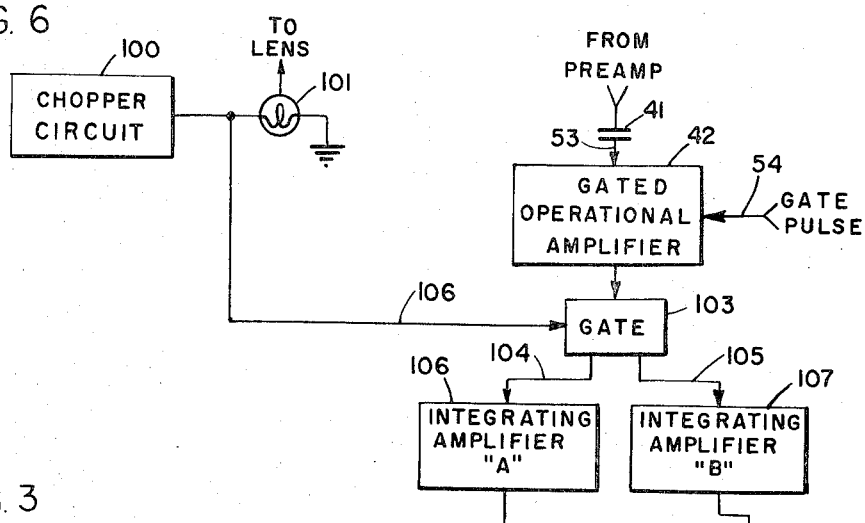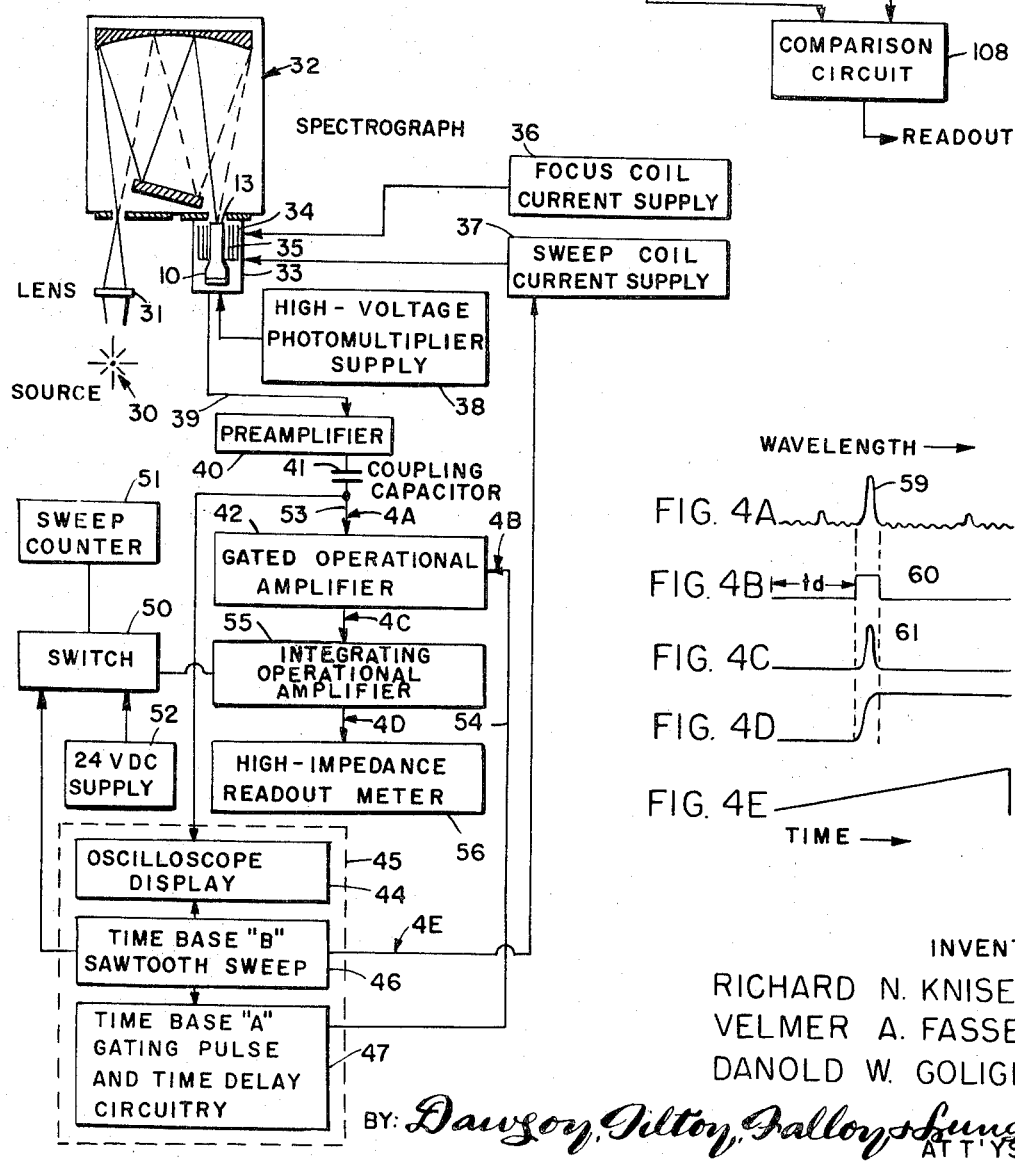

United States Patent Office 3,563,657
Patented Feb. 16, 1971

3,563,657
DIRECT-READING SPECTROMETER SYSTEM AND METHOD FOR NARROW RANGE MEASUREMENTS
Richard N. Kniseley and Velmer A. Fassel, Ames, Iowa, and Danold W. Golightly, Urbana, Ill., assignors to Iowa State University Research Foundation, Inc., Ames, Iowa, a corporation of Iowa
Filed Aug. 9, 1968, Ser. No. 751,404
Int. Cl. G01j 3/06, 3/42
U.S. Cl. 356—98                               6 Claims

ABSTRACT OF THE DISCLOSURE

An electron image of the dispersed spectral lines characteristic of a chemical element being analyzed is periodically scanned across a slit-like aperture of an image dissector phototube. A gating pulse is delayed relative to the start of each sweep to signal the time when the narrow range of interest in the electron image is passing through the slit; and the gating pulse enables an amplifier receiving the output signal of the phototube to selectively amplify only this narrow range. The signal from the gated amplifier is then fed to an integrator circuit which stores the gated signal for a known number of sweeps.

BACKGROUND

The present invention relates to a direct-reading spectrometer; more particularly, it relates to a spectrometer capable of isolating a very narrow range of a much wider optical spectrum and generating a signal representative of the relative optical intensity of that range. Direct-reading spectrometry refers to the spectroscopic-electronic technique of rapid chemical analysis. Prevailing systems conventionally employ electron multiplier phototubes to obtain measurements of relative spectral line intensities and to identify the quantities of each of the chemical elements producing the line radiations by means of the intensity information. The phototubes receive an optical image transmitted through an optical slit identifying a particular spectral line and generate an amplified electrical signal representative of the intensity of that optical image.

In a typical spectrometer, optical radiation from a source such as an electrical arc, spark or a flame is dispersed by a prism or grating spectrograph. That is, each individual component representative of a different wavelength in the composite optical image is isolated or separated from components of a different wavelength. Individual spectral lines of interest are passed through slits located in the focal plane of the spectrograph for each line to be analyzed. The radiant flux through each slit is then directed onto the photocathode surface of a conventional photomultiplier tube to convert the optical image to an electrical signal having an amplitude representative of the intensity of the incident luminous flux. The electrical signal is then stored in a capacitor. The potential across the storage capacitor is a direct representation of the relative optical intensity of the spectral line observed. Thus, line intensity ratios can be determined as rapidly as potentials (which correspond to line intensities) can be measured; and this measurement can be related to a concentration by comparison with predetermined calibration information.

The accuracy and reliability of this simplified version is very sensitive to a number of factors. First of all, the exit slits must be positioned along the focal plane of the spectrograph with tolerances of the order of a few microns; and these slits must be held in this same position relative to the optical spectrum for the duration of the integration period. The dispersion of the particular spectrograph used and the nature of the spectrum being analyzed may make this a difficult problem to overcome. Further, in the case in which it is desired to perform the same analysis on a number of similar samples, there is a requirement for long term operating stability of the system. A number of factors militate against such stability—for example, thermal expansion of the slit mounting bar, expansion and contraction of the grating, and drift in the DC integrating amplifiers, if used. These factors may, however, be compensated to some extent by regulating the ambient temperature of the system.

Atmospheric pressure and humidity changes which affect air density (and thus refractive index) are not so easily controlled. Another source of non-linearity occurs in the measuring apparatus if the voltage being measured on the storage capacitor exceeds about 10% of the applied voltage.

As mentioned, the electronic circuitry which performs the integration must also remain very stable over extended periods of operation in order to be able to accurately reproduce the same results for extended integration periods. In the case of arc or spark discharges, compensation must also be made for the usual matrix effects, excitation conditions, electrode shapes, etc.

Aside from the source of error in the equipment itself, the spectral background produces a signal which diminishes the accuracy of results. Spectral background is continuous radiation which is always present; it occurs over the entire optical spectrum and is not characteristic of the element being analyzed. The optical intensity measured at the exit slit is the sum of the intensity of the spectral line of interest and background intensity; and correction or compensation must be made for the background intensity to obtain accurate results.

Various methods have been suggested for correcting for spectral background. One method suggests the use of separate phototubes to measure the spectral background adjacent to the line intensity of interest. Usually, the spectral background is measured only one side of the spectral line of interest; but measurements on both sides of the line of interest may be made and an averaging of these readings provides a more accurate signal representative of spectral background. However, this approach requires the use of additional phototubes for each spectral line being analyzed; and it requires accurately positioning the exit slits for measuring the background. These slits for measuring background alone must be placed immediately adjacent to the exit slits for the spectral line of interest.

A second method of correction for background radiation uses a "blank" sample of matrix material to determine the spectral background. A signal is generated representative of the spectral background of the matrix alone; and this signal is then subtracted from all subsequent measurements for that spectral line. This method is unsatisfactory because the background may change with time and with variations in the composition of the sample; and it requires very great stability in the measuring electronics.

SUMMARY

The present invention overcomes the problems of accurately locating the exit slits in conventional direct-reading, narrow range spectrometric analyzers by focusing the dispersed optical image on the photocathode of an image dissector photomultiplier tube to generate an electron image which corresponds to the optical image of the separated spectral lines comprising a portion of the optical spectrum for the sample being analyzed. The electron image is then magnetically focused onto a planar aperture which defines a slit oriented in the direction of the spectral lines as they appear in the electron image. A magnetic deflection coil is driven by a sweep generator which produces a linearly-increasing current with time. The deflection coil translates or shifts the electron image across the slit in the anode target at uniform velocity so that very narrow ranges of the total spectrum of wavelengths of the electron image impinge on the first dynode of the electron-multiplier section of the image dissector tube which thus generates an electrical signal representative of the intensity of the spectral line whose electron image traverses the slit of the aperture.

Image dissector phototubes have been used in spectroscopy; however, their use has been limited to the simple application of rapidly scanning a large spectral range for the purpose of displaying (as on an oscilloscope) a signal representative of the intensity of the spectrum over the entire region. This corresponds to a qualitative analysis of the sample whereas the present system is directed to a quantitative measurement over an isolated, preselected narrow range of the optical wavelength spectrum.

The output of the image dissector tube is fed to a gated amplifier which is enabled for a predetermined time interval corresponding to a selected spectral line in the electron image. Thus, the output of the gating amplifier exists only for that time in which the spectral line of interest on the electron image is passing through the slit in the anode target; and this output signal is fed into an integrating circuit.

As the electron image is periodically swept across the aperture, the integrating circuit stores a signal representative of the integral of the intensity for the spectral line of interest; and the number of sweeps is recorded.

Thus, the present invention provides a nonmechanical scanner for a direct-reading spectrometer with a very fast response time (as distinguished from the vidicon and image orthicon which store charge for a short time) and utilizes the wide range of linear response characteristic of the phototube. In addition, prior problems of DC drift in the integrating system are overcome because the fixed spectrograph exit slits are eliminated, further obviating the problem of positioning the slits. Secondly, by AC coupling the output signal to the gated amplifier, the steady background signal is eliminated—namely, the dark current and spectral background signals. Further, the capability of selectively gating signals for integration permits signal averaging techniques to further enhance the signal-to-noise ratio of the output signal. In addition, the integral obtained using the image dissector tube is the time integral over the entire width of the selected spectral line. This is distinguished from the case in which only the peak intensity of a spectral line is measured. In the latter case, changes in peak intensity occur if the spectral line width changes or if the band pass of the measuring instrument changes. Integration over the entire width of the spectral line renders the measurements relatively insensitive to these changes.

A further advantage of the present invention is that a scanning phototube may be combined with a chopped source of light; and atomic absorption and emission measurements could be made simultaneously. In this instance, the chopping frequency is considerably lower than the scanning frequency.

Other features and advantages of the present invention will be obvious to persons skilled in the art from the following detailed description of a preferred embodiment accompanied by the attached drawing wherein identical reference numerals will refer to like parts in the various views.

THE DRAWING

FIG. 3 is an electrical schematic functional block diagram of a system according to the present invention;

FIGS. 4A–4E are idealized voltage waveforms at various locations in the system of FIG. 3;

FIG. 6 is a modified version for use in atomic absorption analysis.

DETAILED DESCRIPTION

Figure 1:
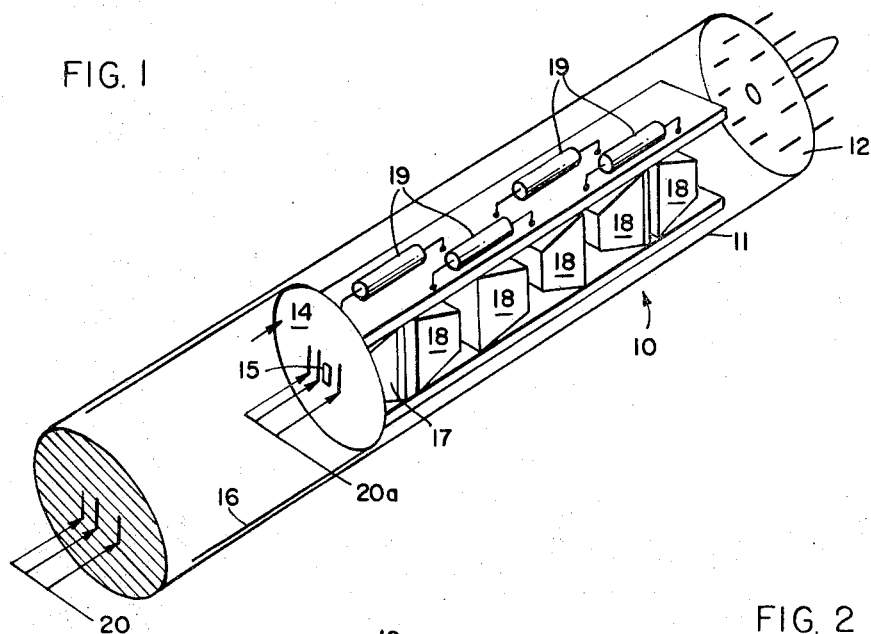
FIG. 1 is a perspective view of a dissector phototube modified for use in the present invention without its focusing and deflection coils.

Before explaining the system of the present invention; it will be advisable to explain the nature and operation of the image dissector phototube in detail. Referring then to FIG. 1, the image dissector phototube is generally designated by reference numeral 10; and it includes an envelope 11 which may be made of glass, and a conventional pin-equipped socket 12 for coupling exterior leads to the various components within the tube 11, such interior connections are not shown for simplicity.

At the input end of the image dissector tube there is a photoelectric plate 13, herein referred to as the photocathode, which emits electrons at a rate which is directly proportional to the intensity of incident light at a point on the photocathode. The emitted electrons are then focused by means of a magnetic focusing coil (explained further hereinafter) onto an apertured plate (i.e. an anode target) 14 which defines a central slit 15. A drift tube 16 is interposed between the photocathode 13 and the apertured plate 14; and it is conductively coupled to the apertured plate 14. A plurality of dynodes including a first dynode 17 and a number of succeeding dynodes 18 are arranged along a line and biased at successively higher positive potentials by means of a divider network including resistors 19 to accelerate the electrons which pass through the aperture 15 according to conventional photomultiplier technique.

The first dynode 17 receives the electrons passing through the slit 15 and amplifies this signal. The subsequent electrodes 18 provide further stages of amplification for this signal. In FIG. 1, the lines representative of the separated or dispersed spectral lines are schematically designated at 20 on the photocathode 13, with the corresponding electron image on the apertured plate 14 being designated 20a.

Figure 2:
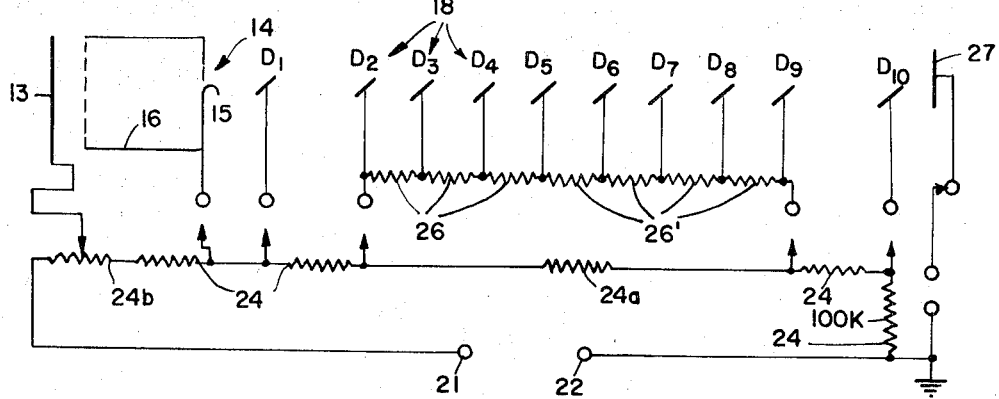
FIG. 2 is an electrical schematic diagram of the phototube of FIG. 1 together with its bias supply.

Turning now to FIG. 2, a high voltage supply is coupled between the terminals 21 and 22 across which are connected in series a plurality of exterior bias resistors 24 including a relatively high-valued resistor 24a and a potentiometer 24b. The movable contact of the potentiometer 24b is connected to the photocathode 13 and a higher potential is supplied to the apertured plate 14. The first dynode 17 is biased at the same potential as the apertured plate 14; however, the subsequent dynodes 18 are biased at successively higher potentials by means of the internal divider resistors 26. The final anode 27 collects the amplified electron beam; and the output signal is developed between the anode 27 and the grounded terminal 22.

Turning now to FIG. 3, the source of light being analyzed is generally denoted 30; and the light issuing therefrom is focused by means of a lens 31 to the input of a conventional spectrometer 32, such as 0.5 meter Ebert spectrometer manufactured by Jarrell-Ash Company. The spectrometer 32 is used in a conventional manner to separate the individual spectral components of the light issuing from the source 30 into a plurality of spaced-apart locations on the focal plane of the spectrometer. The light intensity at a given location is representative of the intensity of a given spectral component in the light emitted from source 30. The image dissector phototube 10 is placed with its photocathode 13 at the output of the spectrometer 32; and the image dissector phototube 10 used in our embodiment was a type F–4011 manufactured by ITT Industrial Laboratories, Fort Wayne, Ind. It was selected for its so-called S–1 response photocathode, which will be recognized by persons skilled in the art as characterized by having a relatively high dark current (that is, a steady random background current) which generally limits the sensitivity of commonly-available photomultipliers used in systems employing DC integration techniques. A specially-designed housing 33 for the photomultiplier 10 will be described in detail later; and for present purposes it need only be stated that it includes a focusing coil 34 and a deflection coil 35. The focusing coil 34 is energized by means of a focus coil current supply 36 which may be a conventional variable source of DC current. The deflection coil 35 is energized by a sweep coil current supply 37. A high voltage photomultiplier supply 38 generates the high voltage which is fed to the previously-described terminals 21 and 22, normally this voltage is a steady voltage of less than 2500 volts.

The output from the photomultiplier tube is taken along a line 39 and fed to the input of a pre-amplifier 40, the output of which is coupled through a capacitor 41 to a gated operational amplifier 42. This same input signal is also fed to the vertical deflection coils of the cathode ray tube 44 of a conventional oscilloscope 45, which may be a Tektronix 545A oscilloscope.

The oscilloscope 45, besides having a CRT display, also includes a sawtooth sweep generator 46 and a time delay circuit 47 which may be triggered by a common sync pulse to hold their output signals in synchronism. Both the sawtooth sweep generator 46 and the time delay circuit 47 are synchronized so that the linearly-increasing voltage output of the circuit 46 starts at the same time as the delay circuitry 47; and they recur periodically, both having the same period. Sawtooth voltage generators are well known in the art; and so are variable time delay circuits. Any of the known equivalent circuits may be substituted for those described. The time delay circuit delays an output pulse a predetermined and settable time; and it is conventional that the width of the output pulse is variable over an extended range. That is, both the delay time and the pulse width are independently variable.

The output of the sweep generator 46 is coupled through a switch 50 to a sweep counter 51 which records a count of the total number of sweeps after an indicated time. A bias voltage supply 52 is also fed through the switch 50 to supply bias voltage for the circuitry in the integrating operational amplifier 55.

The gated operational amplifier 42 has a signal or input lead 53 and a gating lead 54. Unless a signal is present at the gating lead 54, an input signal at the input lead 53 will not appear at the output of the operational amplifier. The output of the gated operational amplifier 42 is then fed to the input of an integrating operational amplifier 55. A high impedance readout meter 56 may be connected to the output of the integrating operational amplifier 55.

As previously mentioned, the sweep current generator 37 receives the linearly increasing voltage signal from the sawtooth generator 46 and generates a corresponding linearly-increasing current to drive the deflection coils 35 to shift or sweep the electron image across the slitted apertured plate 14 periodically and at constant speed. As is conventional, the image is reset to its original position at a very high speed (relative to the sweep time) as with a fly-back transformer so that the sweep signal occurs only in one direction for all practical purposes. There may be from ten to one thousand sweeps per second, for example.

The output signal of the final photomultiplier anode taken along the line 39 is shown in FIG. 4A wherein the abscissa is time (but also representative of the distance across the electron image) and the ordinate is voltage. The sweep voltage is shown in FIG. 4E; and it will be appreciated that FIGS. 4A–4E are idealized representations for a single sweep, and that a known number of such sweeps will be made during the course of an analysis. The output signal from the time delay circuit 47 is shown in FIG. 4B; and it has been shown that the time delay $t_D$ has been adjusted so that the pulse 60 occurs beneath the spectral signal 59 of interest. The width of the pulse 60 has also been adjusted to completely overlap (although not necessary in all cases) the time during which the spectral signal 59 occurs. The gating pulse 60 enables the gated operational amplifier 42 to transmit and amplify the pulse 59 which results in the signal shown in FIG. 4C. The pulse 61 is an amplified version of the pulse 59, although not indicated as such in the drawing. The pulse 61 is then fed into the input of the integrating operational amplifier 55, the output of which is seen in FIG. 4D to increase each time such a pulse is fed into it. Each time a sweep is made, a count is registered in the sweep counter 51 so that an average integrated output per sweep may be determined by dividing the value in the readout meter 56 by the total number of sweeps registered for a given experiment.

Figure 5:
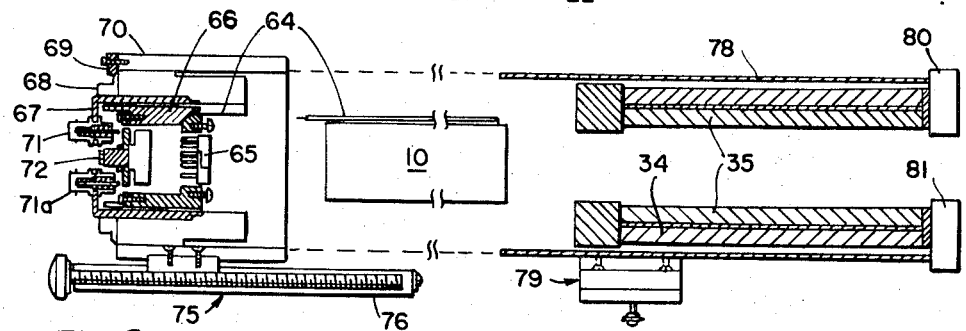
FIG. 5 is a side elevation view, partially exploded and partially cut-away illustrating a mechanical adaptor for mounting the phototube to a conventional spectrograph.

The mounting modification made to the conventional spectrograph 32 described above in order to receive the phototube is shown in FIG. 5. The phototube is again generally designated 10; and the input cathode bias lead is 64. The phototube is received in a conventional pin base connector 65 which is secured to a plastic encasement 66 which also encloses all external resistors in the voltage divider bridge described in connection with FIG. 2.

The plastic base 66 is secured in a brass base 67 which is mounted in an aluminum rotational adjustment mechanism 68 having a clamp 69, one end of which is secured to an exterior aluminum base 70. This mounting arrangement permits linear alignment between the lines which are received from the spectrograph and the direction of elongation of the slit 15 in the aperture 14 described in connection with FIG. 1.

A high voltage connector is illustrated at 71; the output connector at 71a; and a potentiometer 72 including a screwdriver adjustment provides an electrostatic focus adjustment of the electron image on the aperture plate. A conventional screw adjustment assembly 75 housed in a sheath 78 provides a fine optical focus adjustment to adjust the optical image on the photocathode of the tube 10. The entire tube is surrounded by a cylindrical brass housing 78. A clamp 79 is secured to the housing 78 to receive the screw adjustment for the optical focus 75 and is adapted to clamp the sheath 76 of the adjustment to the cylindrical housing 78. The magnetic focus coil is shown at 34; and the magnetic deflection coils at 35. A brass mounting bracket 80 defining a central aperture 81 is adapted to attach the housing 78 to the spectrometer so that the optical image generated by the spectrometer will be transmitted to the aperture 81 onto the photocathode of the tube 10.

OPERATION

The output signal of the preamplifier 40 which is AC coupled by means of the capacitor 41 is displayed on the CRT of the oscilloscope 45; and again, the signal is similar to that seen in FIG. 4A. The oscilloscope display provides the information on position and relative intensity advantageous to spectral line identification. The delay gating pulse signal as seen in FIG. 4B may be located on the same display by modulating the intensity of the beam so that the time delay $t_D$ and pulse width may be properly adjusted to have coincidence between the gating pulse 60 and the spectral lines originating from the steady emission source.

As is conventional, both the gated operation amplifier 42 and the integrating operational amplifier 55 are provided with zero offset controls which affect the output signal for a given input reference signal. In the present application, this becomes very advantageous because the zero offset controls on both the integrating and gated operational amplifiers are adjusted so that no output signal (measured at the output of the integrating amplifier) appears over the desired integration period. The grating of the spectrometer is rotated until spectral lines of interest originating from a stable source of known radiation are located on the oscilloscope display. Then, the width and position of the gate pulse are set with the time base and delay control on the oscilloscope facepanel to isolate the desired spectral line pulse. The zero offset controls are readjusted to eliminate any output signal that originates from interfering band structure from the source. This correction proves extremely useful in eliminating background signal and optimizing the signal-to-noise ratio of the output signal. Signal integrations are then performed by energizing the integration circuit and sweep counter by means of the switch 50.

The isolation of the recurring signal pulses which represent a single spectral line is electronically accomplished by gating the amplifier 42 at a predetermined and selected time in the repetitive recurrence of the overall sweep signal. During the gating interval, which corresponds to the width of the gating pulse 60 in time, the amplifier 42 amplifies whatever signal is present at its input. At all other times, there is no output signal from the amplifier 42. It is important to recognize the identity between the time integral of the voltage pulse stored in the integrating operational amplifier 55 and the wavelength integral of the spectral line under study; that is, in so far as the integration operation is concerned, time (i.e. sweep time) is linearly related to wavelength of the optical image because the optical spectrum is swept across the narrow slit in the apertured plate of the image dissector phototube.

The integration process may be started and terminated with a simple double-pole, double-throw switch as at 50 which simultaneously controls the sweep counter and the integrating operational amplifier 55. Further, the integrations may be terminated in one of two ways; either the number of sweeps required to accumulate definite voltage may be counted or the integrated voltage for a recorded number of sweeps may be determined. That is, however many sweeps as are needed to generate a predetermined threshold voltage at the output of the integrating operational amplifier 55 may be made.

MODIFICATION FOR ATOMIC ABSORPTION ANALYSIS

Turning now to FIG. 6, there is shown a modification of the present system for atomic absorption analysis. In the drawing, only that portion of the system of FIG. 3 which requires modification is shown, the remainder may be the same as illustrated therein. A chopper circuit 100, which may be a free-running multivibrator circuit having a repetition rate which is much lower (for example, by at least an order of magnitude) than the scanning frequency, energizes a continuum source of light 101. The light from the source 101 is then transmitted to the lens of the spectrometer through an atomic vapor which contains the sample being analyzed (together with its flame vaporizer, if any). For example, if a flame is used to vaporize a chemical element so that free atoms are present, the light from the source 101 will be directed through the element and then into the lens and thence to the spectrometer 32 of FIG. 3. The gated operational amplifier 42 remains the same, as does its gating lead 54 and its signal lead 53 from capacitor 41. However, the output of the gated operational amplifier 42 is fed to the signal input of a gate 103. The gate 103 has a first output lead 104 and a second output lead 105; its input signal will be gated either to the lead 104 or the lead 105 depending upon the presence or absence of a voltage at a gating lead 106 which is received from the output of the chopper circuit 100.

An integrating amplifier "A" 106 receives the signal on line 104; and a second, similar integrating amplifier "B" 107 receives the signal on the input line 105. The output signals of the amplifiers 106 and 107 are then compared in a comparison circuit 108; and the output of the comparison circuit is fed to a conventional readout means. When there is a signal at the output of the chopper circuit 100, the filament of the lamp 101 is excited so that the element under analysis in the flame absorbs its characteristic spectral lines; and the resulting signal (that is, the signal less the amount of light absorbed by the chemical element being analyzed plus any emission from the flame) is fed into the gated operational amplifier 42 for the narrow spectral line determined by the gating pulse at its gate lead 54. This signal from the chopper circuit 100 also energizes the gate 103 to steer the output pulse from the amplifier 42 to the integrating amplifier 106. When the output signal from the chopper circuit 100 is reduced to zero, the light is turned off; and the output signal from the gated operational amplifier 42 (which now is measuring the emmission spectrum for the chemical element being analyzed) is steered into the integrating amplifier 107. Thus, the comparison circuit 108 generates a signal which is representative of the absorption spectrum of the chemical element being determined as compensated by the emission spectrum thereof. Other standard signal separation techniques may also be used to separate the absorption signal from any emission signal from the flame.

Thus, this method improves atomic absorption techniques which employ a continuum light source because the continuum emission from the primary light source (represented by a steady signal or varying at a very low frequency) is prevented from entering the readout system (by the blocking capacitor or other suitable filter. Only the signals which represent sample absorption are fed to the gated amplifiers and integrated thus improving the sensitivity and detectability of atomic absorption systems using continuum sources.

Having thus described in detail a preferred embodiment of our inventive system, it will be apparent to persons skilled in the art that certain modifications may be made and equivalent systems components substituted; and it is, therefore, intended that all such modifications and substitutions be covered as they are embraced within the spirit and scope of the appended claims.

We claim:

1. A spectrometer system comprising a spectrometer for receiving light from a source being analyzed and for generating an optical image of the separated spectral lines of said light; an image dissector phototube having a photocathode for receiving said optical image of said spectrometer, an apertured plate defining a slit positioned behind the photocathode photomultiplier means for receiving electrons passing through said slit for amplifying the same, means for focusing an electron image formed at said photocathode onto said plate, and deflection means for sweeping said focused electron image across said plate; a source of increasing current for energizing said deflection means of said phototube to periodically sweep said electron image across said slit, electrons passing therethrough being amplified by said photomultiplier means to generate an output signal varying in time according to the spatial intensity of said electron image; gate means synchronized with said current source and receiving said output signal for amplifying the same only over the same predetermined time interval for each such periodic sweep; integrator means receiving the amplified output signal of said gate means for storing a signal representative of the time integral of a number of said gated signals; and counter means for generating a signal representative of the number of times said electron image sweeps across said slit.

2. The system of claim 1 wherein a capacitor is interposed between the output of said image dissector phototube and the input of said gate means, thereby to AC couple said output signal to said gate means and block steady signals representative of spectral background.

3. The system of claim 1 wherein said integrator means includes a time delay circuit with a variable time delay and wherein the predetermined time of said gate means is settable.

4. The structure of claim 1 wherein said gate means includes a first gated operational amplifier and said integrator means includes first and second integrating amplifiers for receiving the amplified output signal from said gated operational amplifier; periodically energized chopper circuit means feeding a source of light directed to a chemical element under atomic absorption analysis, said chopper means connected to alternately gate the output of said gate means to said first and second integrating amplifiers; and difference circuit means receiving the output of said first and second integrating amplifiers for generating an output signal representative of the difference between the same, said output signal being representative of the absorption of said chemical element of a specific narrow range of light emitted from said source compensated by the emission of said chemical element due to its excitation to a free atomic state.

5. In a method of spectrometric analysis, the steps comprising: generating a dispersed optical image including separated spectral lines of a chemical element; focusing said optical image on the photocathode of an image dissector phototube having a slitted plate to generate a corresponding electron image; recursively sweeping said electron image across said slitted plate to generate an electrical output signal representative of the spectral composition of said optical image; recursively gating a predetermined narrow range of said output signal in time relation with said step of sweeping to obtain successive signals representative of said narrow range; and integrating said successive signals while recording the number of said sweeps.

6. The method of claim 5 for use in atomic absorption analysis further including the steps of periodically energizing a source of continuum light directed at a sample at a repetition rate lower than the sweep rate; electrically filtering out signals caused by said continuum source; and, synchronously with said energizing of said light, alternately storing said integrated signals in separate circuits; a comparison of said stored signal representing the absorption corrected for any emission of said element over said narrow range.

References Cited

UNITED STATES PATENTS

| | | | |
|---|---|---|---|
| 3,385,160 | 5/1968 | Dawson et al. | 356—96 |
| 3,486,822 | 12/1969 | Harris | 356—83 |

OTHER REFERENCES

Harber et al.: Applied Optics, vol. 5, No. 6, June 1966, pp. 1039–1043.

RONALD L. WIBERT, Primary Examiner

F. L. EVANS, Assistant Examiner

U.S. Cl. X.R.

356—83, 97